United States Patent [19]

Owen

[11] Patent Number: 5,042,050
[45] Date of Patent: Aug. 20, 1991

[54] DIGITAL CORDLESS TELEPHONE SYSTEMS

[75] Inventor: Frank C. Owen, Pettswood, England

[73] Assignee: U.S. Philips Corporation, New York, N.Y.

[21] Appl. No.: 521,298

[22] Filed: May 7, 1990

[30] Foreign Application Priority Data

May 26, 1989 [GB] United Kingdom ............. 8912176.8

[51] Int. Cl.$^5$ ............................................. H04B 15/00
[52] U.S. Cl. ........................................................ 375/1
[58] Field of Search ............................................ 375/1

[56] References Cited

U.S. PATENT DOCUMENTS 4,866,732  9/1989  Carey et al. ............................ 375/1

Primary Examiner—Thomas H. Tarcza
Assistant Examiner—David Cain
Attorney, Agent, or Firm—Anne E. Barschall

[57] ABSTRACT

A digital cordless telephone system which comprises a primary station (PS) controlled by a system controller (14 or 15) and a plurality of secondary stations (SS) capable of communicating with the primary station by way of a time division duplex radio link, the primary and/or secondary station having means to generate a beacon signal which is receivable by a secondary station outside the range of normal speech communication and the beacon signal comprising a low bit rate signal which is transmitted at a power comparable to the digitized speech signal. In one embodiment the beacon signal is recovered using a narrowband filter and a demodulator. In another embodiment direct sequence spread spectrum techniques are used to send the beacon signal and a correlator/matching circuit is used to recover the low bit rate data representative of the beacon signal.

13 Claims, 2 Drawing Sheets

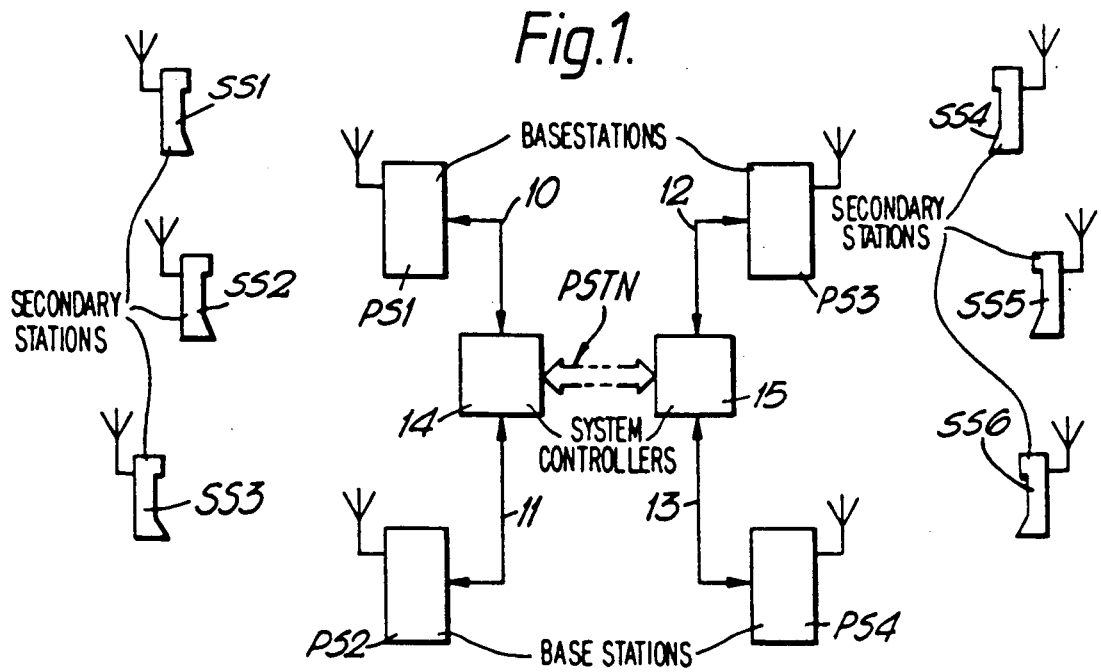
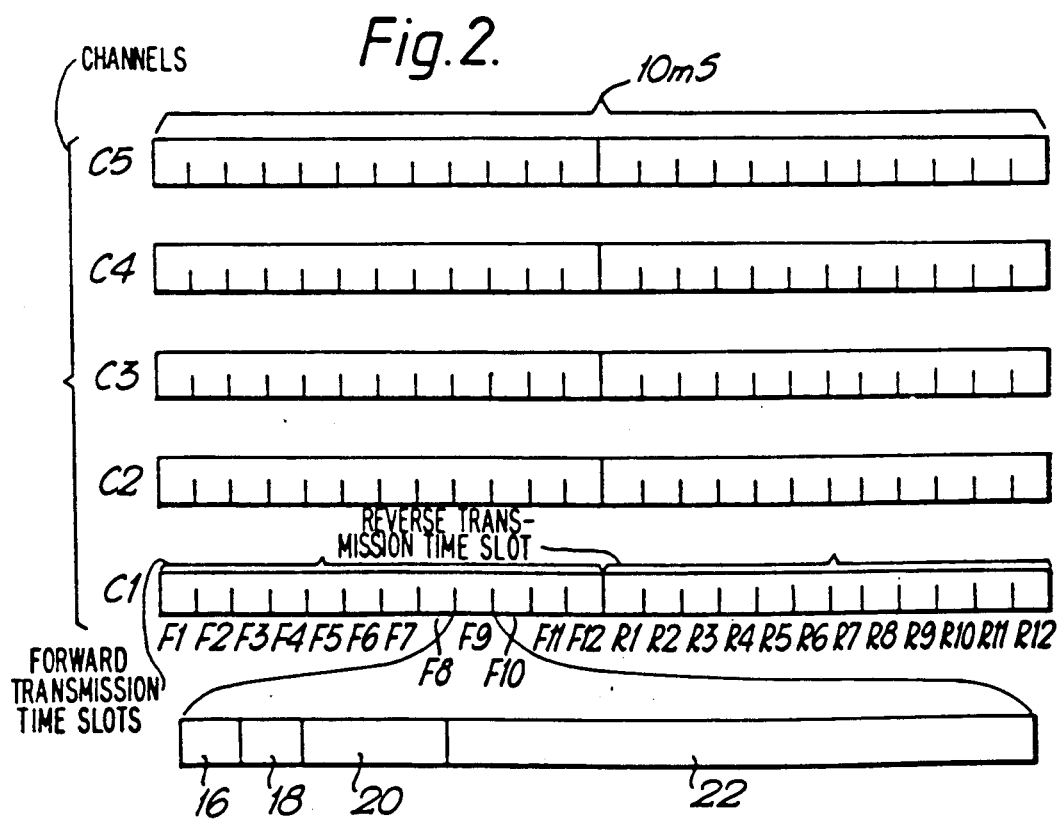

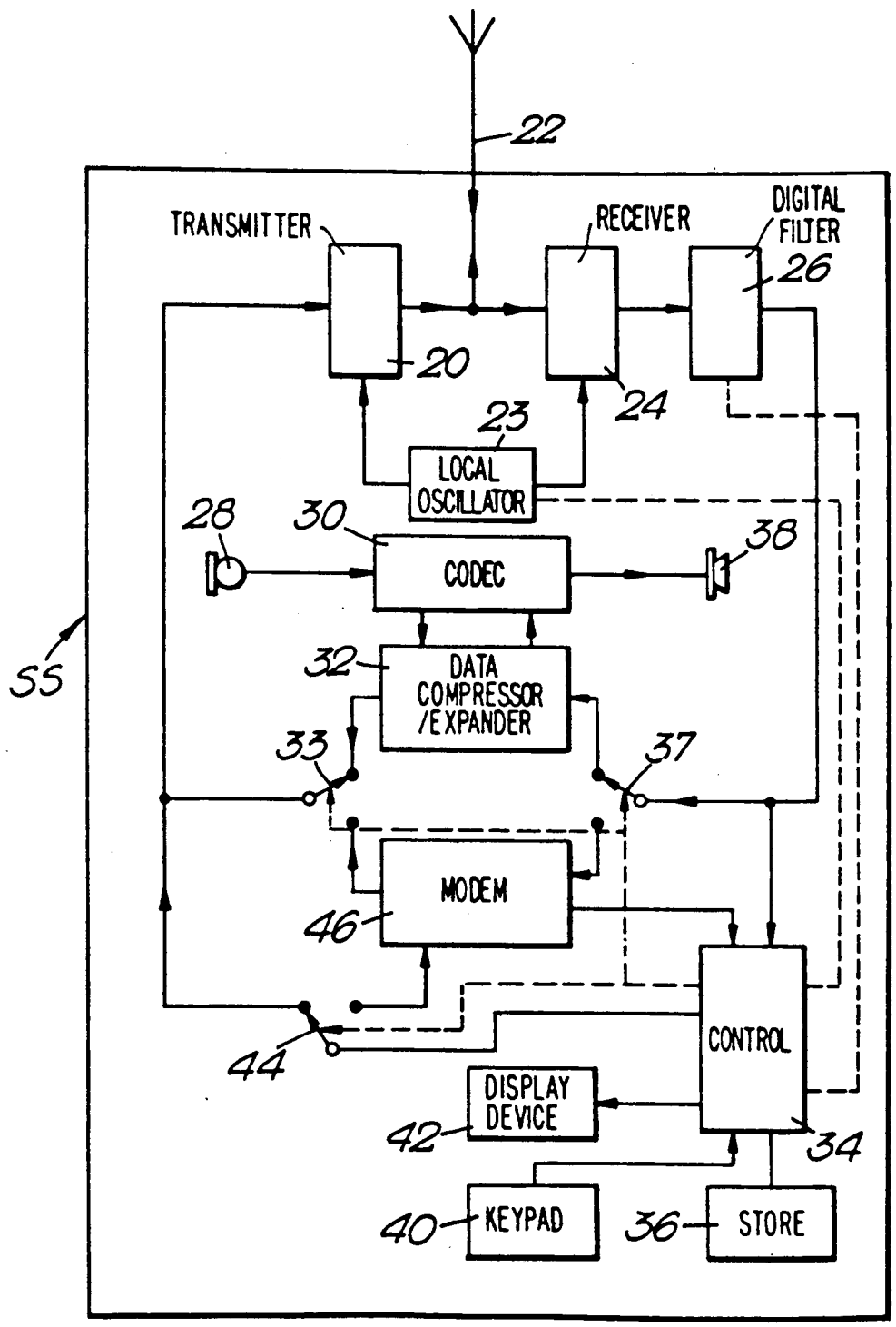

DIGITAL CORDLESS TELEPHONE SYSTEMS

The present invention relates to a digital cordless telephone system which comprises at least one primary (or base) station and a plurality of transportable secondary stations, and more particularly to a system in which beacon signals are generated by the primary and/or secondary stations, which beacon signals may be used by a primary station to page a secondary station, to give the absolute location, to give the location and direction of a primary station relative to a secondary station, to act as emergency signals especially by the user of a secondary station, and/or to advertising and/or public service announcements.

The need for the provision of beacon signals may arise if, for example, a primary station acts as an access point into the public service trunked network (PSTN) and a user equipped with a secondary station, which has a range for digitised speech of 100 to 200 meters, wishes to make a call and wants to find out his nearest primary station, which may be out of sight, particularly in an urban area, and out of radio range at least insofar as speech is concerned.

One way of increasing the range of the beacon signals is to increase the power of the beacon signal. However, this will increase the interference to other users and in consequence is not a solution to be recommended.

An object of the present invention is for a primary or secondary station to be able to generate a beacon signal without increasing the interference to other users and enabling the existing system structure and frequency band to be used.

According to one aspect of the present invention there is provided a digital cordless telephone system comprising a primary station and a secondary station, each said station comprising a transceiver whereby digitised speech communication is established on a time division duplex channel, and means in at least the primary station for producing a beacon signal comprising a data signal having a net data rate substantially less than the digitising rate of the speech signal.

The present invention is based on the concept that if the system gain for the beacon signal can be increased whilst using the existing system structure, existing frequency band and a power output corresponding to that of a speech signal then an increased range for the beacon signal can be obtained without increasing the interference to other users.

One embodiment of the invention is based on the principle that the system gain and bandwidth of a filter are related such that, for example, an increase in bandwidth will cause a decrease in gain and vice versa. Accordingly, by transmitting a low bit rate beacon signal then the receiver filter bandwidth can be reduced which provides a gain in the signal to noise ratio at the receiver demodulator for the same transmitter output power. This in turn means that the receiver demodulator is capable of receiving such beacon signals at a greater range from the primary station than is possible with digitised speech, the speech transmission range being of the order of 100 to 200 meters.

Another embodiment of the invention is based on a direct sequence spread spectrum technique whereby the low data rate signal is spread over the full speech bandwidth by multiplying it by a pseudo-random bit sequence, for example, an orthogonal pseudo-random code. In recovering the low data rate signal, a processing gain of the order of 27 dB is achieved which enables the data to be recovered over a range greater than the speech range.

The primary station may signal continuously in a respective duplex channel constituted by a pair of non-adjacent forward and reverse slots (or physical channels), the signalling rate normally being the digitised speech rate, for example 32 kbits/sec. When the primary station wishes to transmit a low bit rate beacon signal, it substitutes the beacon signal for the speech rate signal currently being transmitted.

If desired, the secondary station may have means for producing a beacon signal, such as an emergency signal, which can be relayed to the primary station.

The bit rate of the beacon signal may be a factor of at least 100 times less than that of the speech digitisation rate.

The output power of the beacon signal may be comparable to the output power of a digitised speech signal. This has the benefit that the same transmitter output power can be used for both digitised speech and the beacon signal, and each signal can achieve its desired range without the need for, say, booster amplifiers for the beacon signal, which booster amplifiers will consume a greater amount of current and lead to the generation of undesired interference.

According to another aspect of the present invention there is provided a secondary station for use in a digital cordless telephone system in accordance with the present invention, comprising a transceiver, a CODEC for encoding speech to be transmitted and decoding received encoded speech, means for recovering a low data rate signal having a data rate substantially less than that of the digitised speech and means for deriving a beacon signal from the recovered low data rate signal.

One embodiment of the secondary station may further comprise a narrowband filter for recovering the low data rate signal received by the transceiver, and a MODEM for deriving a beacon signal from the recovered low data rate signal.

Another embodiment of the secondary station for use with a spread spectrum may further comprise demodulating means for demodulating the spread spectrum low data rate signal and a correlator/matching circuit for deriving the "1" and 37 0" bits of the data representative of the beacon signal.

The present invention will now be described, by way of example, with reference to the accompanying drawings, wherein:

FIG. 1 is a block schematic diagram of an example of digital cordless telephone system;

FIG. 2 is a diagram illustrating the channel and message structure used in the system shown in FIG. 1, and FIG. 3 is a block schematic diagram of a secondary station for use in the system shown in FIG. 1.

The digital cordless telephone system shown in FIG. 1 comprises a plurality of primary or base stations PS of which four, PS1, PS2, PS3 and PS4, are shown. Each of the primary stations is connected by way of a respective wideband landline link 10, 11, 12 and 13, capable of carrying data at a rate of say 1.152 Mbits/sec., to cordless telephone system controllers 14 and 15. The system controllers 14 and 15 are, in the illustrated embodiment, connected to the PSTN.

The system further comprises a large plurality of transportable secondary stations SS1 to SS6 which are optionally for data. Duplex communication between the secondary stations within an area covered by a system controller and/or the PSTN is by way of radio through the primary stations PS. Accordingly the primary and secondary stations each comprise a radio transmitter and receiver.

In a non-illustrated variant of the system shown in FIG. 1, the primary stations are connected to the PSTN, the functions of the systems controllers being delegated to the primary stations.

Referring to FIG. 2, the illustrated system has five radio channels hereinafter referred to as frequency channels, C1 to C5 each capable of carrying digitised speech or data at 1.152 Mbits/sec. The adjacent frequency channel separation is 1.728 MHz. Each frequency channel is divided in the time domain into 10 ms frames. Each frame is divided into 24 time slots (or physical channels) of which the first twelve F1 to F12 are allocated for transmission in a forward direction, that is from a primary station to a secondary station, and the second twelve R1 to R12 are allocated for transmission in the reverse direction. The forward and reverse time slots are twinned, that is, the correspondingly numbered forward and reverse time slots, for example F4, R4, comprise a twin which hereinafter will be referred to as a duplex voice channel. In setting-up a call between a primary and a secondary station, a duplex voice channel is assigned to the transaction. The assignment of the duplex voice channel in any of the frequency channels C1 to C5 is by the method of dynamic channel allocation whereby a secondary station taking account of its radio environment negotiates with the primary station for access to the best duplex voice channel currently available under the control of the primary station.

The general structure of a message is also shown in FIG. 2. The message structure comprises two bytes of preamble 16, two bytes of a synchronisation sequence 18, eight bytes of signalling data 20 and forty bytes of digitised speech or data 22. The digitisation rate and data rate for each duplex voice channel is 32 kbits/sec. Both the primary and secondary stations include a buffer to compress the 32 kbits/sec. digitised speech or data to bursts of digital signals or data at 1.152 Mbits/sec. so that it is suitable for transmission.

The basic protocol for a transmission which is to be initiated by a secondary station SS is for it to come within range of a primary station PS, for example less than 200 m, and to scan all the duplex voice channels and thereby ascertain what pairs of physical channels are busy and what may be regarded as being idle because the level of any signalling is below a predetermined threshold and also the relative signal quality in there physical channels and from the information derived the secondary station determines what it believes is the best duplex voice channel and transmits in the reverse physical channel to a particular primary station PS. The signalling details 20 in the message together with the details 22 in the initial transmission are decoded and passed to the system controller 14 or 15 which sets up the fixed network connection. The primary station confirms that the particular pair of time slots have been assigned to the transaction. Optionally, the primary station PS could set-up the fixed network independently of its system controller, if provided.

In the forward direction, the primary stations send paging messages to the addressed secondary stations in say every sixteenth frame. Such an arrangement enables the secondary stations to "sleep" during the intervening fifteen frames thereby economising on power. An addressed secondary station in response to a paging request addressed to it will, unless a duplex voice channel has been assigned, transmit on the reverse time slot of the best duplex voice channel. Also, each primary station will normally be sending signalling information in a respective duplex voice channel. As a general rule, the system protocol will give priority to speech over data.

In the case of a subscriber cordless telephone service in which each primary station may comprise several transceivers which at any one time can handle calls from a corresponding number of secondary stations, it is necessary for the or each secondary station to move within radio range of a primary station. In busy locations such as airport terminals and central railway stations, the primary stations will be readily identifiable. However, in other areas such as city suburbs a user with a secondary station may not be able to determine visually the location of a convenient primary station.

In accordance with the present invention, it is proposed that a primary station utilises a spare forward physical channel to transmit a beacon signal comprising a low data rate signal. In one embodiment in which a low data rate signal is transmitted having a power comparable to a digitised speech signal, then an out-of-speech range secondary station equipped with a suitable narrowband receiver filter is capable of receiving the beacon signal when at a greater distance, say ten times greater than the speech range, from the primary station. Alternatively, in another embodiment the low data rate signal is transmitted using a spread spectrum technique and the signal processing gain achievable at the receiver enables an out of range secondary station to derive the beacon signal. The beacon signal may comprise a short message which gives the geographical location of the primary station, the location message can then be displayed on a display panel provided in the secondary units.

Since the low data rate channel is a TDD one, then in a refinement of the system having intelligent cordless telephone system controllers 14, 15 (FIG. 1), which store a map of the local area, the user of a secondary station can signal his own position using the related reverse slot (or physical channel). This information is relayed to the system controller which has been programmed to compare the user's position with the stored map and to provide guidance information, such as "Turn-left 200 meters", which is relayed to the secondary station by way of the related primary station. Such an exchange of messages can continue until the secondary station is within speech range. The structure of such messages can be based on the structure shown in FIG. 2 in which the field 22 is used for this purpose.

In the first of the above-mentioned embodiments of the invention the gain in communications range at the expense of bandwidth can be illustrated by the following numerical example. Assuming that a duplex voice channel, that is one forward and one reverse time slot, equals 32 kbits/sec $\times$ 2. Then if a low data rate signal at 50 bits/sec. is transmitted as a beacon signal, the receiver filter bandwidth can be reduced by a factor of 640. This provides a system gain in signal to noise of 28 dB at the receiver demodulator.

In this example, a one hundred character message could be sent within 20 seconds to and from a primary station and a secondary station. In a range squared propagation loss environment 28 dB increased signal to noise ratio corresponds to a 25-fold increase in communications range of 640-fold increase in covered area.

Therefore, if the normal speech radius is 100 meters, the beacon signal will be operational up to a 2.5 km radius. However, such an increase in operational radius is theoretical and does not take into account topology. A more realistic increase will be a ten-fold increase in range (corresponding to a hundredfold increase in covered area) for low data rate communications over speech communications.

Using the beacon signal for determining the location of a primary station is only one example. Other uses of the beacon signal, which may be alternatives or additions to the primary station location information, are the transmission of paging signals from a primary station, the transmission of emergency signals from either the primary station or the secondary station, public service announcements and advertising.

FIG. 3 is a block schematic diagram of a secondary station SS suitable for use in the first of the above-mentioned embodiments. The secondary station SS comprises a transmitter 20 connected to an antenna 22 which is also connected to a receiver 24. A digital filter 26 is included in the received signal circuit to distinguish a digitised speech signal from a low bit rate data signal.

A microphone 28 is connected to a CODEC 30 which includes storage for the digitised speech. The CODEC 30 operates at 32 kbits/sec. The CODEC 30 is connected to a data compressor/expander 32 which compresses the digitised speech into bursts having a data rate of the speech at 1.152 Mbits/sec. A control element 34 is provided which controls the operation and internal organisation of the secondary station and which has a store 36 connected to it for storing amongst other things details of the usage and quality of all the pairs of physical channels. At the occurrence of a reverse time slot in the best available duplex voice channel, as decided by the control element 34, a burst of compressed digitised speech is then relayed by way of a change-over switch 33 to the transmitter 20 whose frequency channel, C1 to C5 (FIG. 2), has been predetermined by the control element 34 applying control signals to a local oscillator 23 as part of the choice of the best available physical channel.

The received digitised speech in the forward time slot is relayed by way of a change-over switch 37 to the data compressor/expander 32 in which it is expanded to digitised speech having a data rate of 32 kbits/sec. and passed to the CODEC 30 and then to a loudspeaker or other audio transducer 38.

A keypad 40 is connected to the control element 34, for keying-in data such as a called party's telephone number. The control element 34 causes the keyed-in data to be displayed on a display device 42. The control element 34 also adds the necessary signalling to the keyed-in data which is conveyed by way of a change-over switch 44 to the transmitter 20.

The switches 33, 37 and 44 are controlled by the control element 34.

In the event of the digital filter 26 detecting the presence of a narrowband, low data rate signal indicating that a beacon signal is being received, it signals this fact to the control element 34 which in response thereto changes over the switches 33, 37 and 44. The low data rate signal is decoded in a low data rate MODEM 46 and the message information is supplied to the control element 34 which causes the message to be indicated by the display device 42 which may comprise an audio/visual device.

If the secondary station SS wishes to "converse" with a primary station in response to the received beacon signal or wishes to initiate a beacon signal, the user actuates the keypad 40 and data is keyed into the control element 34. The control element 34 in response to the receipt of the keyed-in data causes the message to be displayed on the display device 42 and also adds the necessary signalling structure prior to applying it to the MODEM 46 by way of the switch 44. The modulated output from the MODEM 46 is supplied to the transmitter 20 by way of the switch 33.

In a non-illustrated variant of the secondary station, the data compressor 32 and MODEM 46 are replaced by an adjustable rate MODEM controlled by the control element 34.

Referring to the alternative spread spectrum embodiment of the present invention, the secondary station generally resembles that as described with reference to FIG. 3 except that a correlator/matching circuit (not shown) is used in place of the MODEM 46.

The primary station, and, optionally, the secondary station, has means for implementing direct sequence spread spectrum techniques whereby the low data rate beacon signal has its energy spread over the full speech bandwidth using respective orthogonal codes with good autocorrelation for the "1"s and "0"s. The signal is transmitted by the primary station using the existing system structure and frequency band and a power output corresponding to that used for a speech signal.

At the receiver a demodulator demodulates the received beacon signal and passes it to a correlator/matching circuit which extracts the low data rate signal and identifies a "1" or a "0" by means of its orthogonal code.

Despreading the received signal enables a processing gain of the order of 480 (or 27 dB) to be added to the system gain to obtain an improved signal to noise ratio and thereby enabling the beacon signal to be received successfully at a range greater than the speech signal.

From reading the present disclosure, other modifications will be apparent to persons skilled in the art. Such modifications may involve other features which are already known in the design, manufacture and use of cordless telephone systems and component parts thereof and which may be used instead of or in addition of features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. A digital cordless telephone system comprising a primary station and a secondary station, each said station comprising a transceiver whereby digitised speech communication is established on a time division duplex channel, and means in at least the primary station for producing a beacon signal comprising a data signal having a data rate substantially less than the digitising rate of the speech signal.

2. A system as claimed in claim 1, characterised in that the secondary station comprises means for producing a beacon signal.

3. A system as claimed in claim 1, characterised in that the bit rate of the beacon signal is a factor of at least 100 times less than that of the digitisation rate.

4. A system as claimed in claim 1, characterised in that the output power of the beacon signal is of the same order of magnitude as the output power of a digitised speech signal.

5. A system as claimed in claim 1, characterised in that the primary station transmits signalling information in a physical channel and in that a beacon signal is transmitted in the physical channel in place of signalling information.

6. A system as claimed in claim 1, characterised in that the receiver station of the transceiver of at least the secondary station includes a filter having a bandwidth which is narrow in comparison with the bandwidth of the speech signal, which filter is for recovering the data signal representative of the beacon signal.

7. A system as claimed in claim 6, characterised by a demodulator coupled to the digital filter for demodulating the data signal representative of the beacon signal.

8. A system as claimed in claim 1, characterised in that at least the primary station comprises means for applying direct sequence spread spectrum techniques to the data representative of the beacon signal.

9. A system as claimed in claim 8, characterised in that means are provided for applying respective orthogonal pseudo-random codes to the "1" and "0" bits of the data representative of the beacon signal.

10. A system as claimed in claim 9, characterised in that at least the secondary station includes a demodulator for demodulating the spread spectrum signal and a correlator/matching circuit for deriving the "1" and "0" bits of the data representative of the beacon signal.

11. A secondary station for use in a digital cordless telephone system as claimed in claim 1, characterised by a transceiver, a CODEC for encoding speech to be transmitted and decoding received encoded speech, means for recovering a low data rate signal having a data rate substantially less than that of the digitised speech and means for deriving a beacon signal from the recovered low data rate signal.

12. A secondary station as claimed in claim 11, characterised by a narrowband filter for recovering the low data rate signal received by the transceiver, and a MODEM for deriving a beacon signal from the recovered low data rate signal.

13. A secondary station for use in the system as claimed in claim 8, characterised by demodulating means for demodulating the spread spectrum signal, which has a data rate which is substantially less than that of the digitised speech, and a correlator/matching circuit for deriving the "1" and "0" bits of the data representative of the beacon signal from an output of the demodulating means.

* * * * *